United States Patent
Courtney et al.

(10) Patent No.: US 7,062,779 B1
(45) Date of Patent: Jun. 13, 2006

(54) METHODS AND APPARATUS FOR ACCESSING SYNCHRONIZED BROADCAST DATA

(75) Inventors: Jonathan D. Courtney, San Jose, CA (US); Jesus David Rivas, San Francisco, CA (US); Keith L. Messer, Hayward, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 771 days.

(21) Appl. No.: 09/724,732

(22) Filed: Nov. 28, 2000

Related U.S. Application Data

(60) Provisional application No. 60/172,694, filed on Dec. 10, 1999.

(51) Int. Cl.
*H04N 7/16* (2006.01)
*G06F 17/30* (2006.01)
*G06F 9/44* (2006.01)

(52) U.S. Cl. .................. 725/142; 719/318; 719/328; 707/8

(58) Field of Classification Search ............ 725/32–36, 725/40, 51, 105, 109–110, 39, 112, 142; 718/1; 719/310, 318, 328; 707/8, 201
See application file for complete search history.

(56) References Cited

U.S. PATENT DOCUMENTS

| | | | | |
|---|---|---|---|---|
| 5,778,181 A * | 7/1998 | Hidary et al. | ................ | 725/110 |
| 5,901,313 A * | 5/1999 | Wolf et al. | .................. | 719/328 |
| 5,909,579 A * | 6/1999 | Agesen et al. | .............. | 717/131 |
| 5,946,487 A * | 8/1999 | Dangelo | ...................... | 717/148 |
| 5,991,520 A * | 11/1999 | Smyers et al. | .............. | 710/100 |
| 6,038,625 A * | 3/2000 | Ogino et al. | ................. | 710/104 |
| 6,134,602 A * | 10/2000 | Engstrom et al. | ........... | 719/328 |
| 6,282,713 B1 * | 8/2001 | Kitsukawa et al. | ........... | 725/36 |
| 6,317,885 B1 * | 11/2001 | Fries | .......................... | 725/109 |
| 6,326,982 B1 * | 12/2001 | Wu et al. | .................... | 345/718 |
| 6,400,407 B1 * | 6/2002 | Zigmond et al. | ........... | 348/465 |
| 6,437,809 B1 * | 8/2002 | Nason et al. | ............... | 715/778 |
| 6,459,427 B1 * | 10/2002 | Mao et al. | ................... | 725/109 |
| 6,487,543 B1 * | 11/2002 | Ozaki et al. | ................ | 725/112 |
| 6,563,515 B1 * | 5/2003 | Reynolds et al. | ........... | 715/721 |
| 6,785,768 B1 * | 8/2004 | Peters et al. | ................ | 711/112 |
| 6,901,474 B1 * | 5/2005 | Lym et al. | ................... | 710/305 |
| 6,904,599 B1 * | 6/2005 | Cabrera et al. | ............. | 719/328 |

OTHER PUBLICATIONS

Sun Microsystems, Inc., "Java TV™ API Specification", Jun. 14, 1999, Draft 0.9.0, p. 1-34.

* cited by examiner

*Primary Examiner*—Christopher Grant
*Assistant Examiner*—Son P. Huynh
(74) *Attorney, Agent, or Firm*—Beyer Weaver & Thomas, LLP

(57) ABSTRACT

Improved methods and apparatus suitable for accessing synchronized data in a broadcast system are disclosed. A synchronized data accessing system providing an interface that can be used by a data requester to access synchronized data is disclosed. The data requester can initiate a request to access synchronized data using the interface, and data can be made available and accessed by the data requester through the interface.

19 Claims, 5 Drawing Sheets

METHODS AND APPARATUS FOR ACCESSING SYNCHRONIZED BROADCAST DATA

CROSS-REFERENCE TO RELATED APPLICATIONS

This application claims the benefit of: (i) U.S. Provisional Patent Application No. 60/172,694, filed Dec. 10, 1999, and entitled "METHODS AND APPARATUS FOR ACCESSING SYNCHRONIZED BROADCAST DATA", and which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention generally relates to broadcast systems. More particularly, the present invention provides methods and apparatus for accessing synchronized data transmitted by a broadcaster in a broadcast system.

2. Description of the Related Art

In a conventional broadcasting system, a broadcaster transmits information in the form of audio, video, data, etc. over a medium such as air, cable, phone line (DSL, for example) that, in turn, can be received by any number of receivers. For example, transmitted radio waves can be received with a radio receiver tuned to a particular transmission channel. Using this conventional arrangement, typical broadcast communication is generally a one way medium since the receiver does not have control over the content nor the time of the broadcast transmission.

In a digital broadcast system, data can be transmitted in the form of data packets. One such data packet form is defined by the Encapsulated IP datagrams protocol, or by Streaming data in MPEG-2 Packetized Elementary Stream (PES). In the latter case, the transmitted data packets also have associated with them timing information indicating when a particular data packet is to be processed. For example, a Presentation Time Stamp (PTS) can be included in a data packet having a value indicating the time at which a unit of data is to be processed (presented). Such PTS values can be defined relative to a System Time Clock (STC), for example, as defined by ISO/IEC 13818-1.

Data packets could have both internal and external timing requirements. For example, in the MPEG-2 Packetized Elementary Stream (PES) protocol, external timing requirements typically imply that data from one stream must be synchronized with another stream of data. Transmitted broadcast data containing any type of timing information indicating when data should be processed is referred to herein as "synchronized data". Any type of timing information included in a data packet is referred to herein as a "time stamp".

FIG. 1 illustrates synchronized data packets 102–106 transmitted by a broadcaster (not shown). Each of the data packets 102–106 has an associated data segment D1 through D3 respectively, as well as an associated time stamp T1 through T3, respectively. For example, data packet 102 has the time stamp T1 indicating when to process the corresponding data segment D1. During a typical broadcast session, the synchronized data packets 102–106 are received by the digital T.V. receiver at a point of service through what is referred to as a broadcast channel.

As illustrated in FIG. 1, a broadcast channel 2 is subdivided into Video subchannel (V), an Audio subchannel (A), and two Data subchannels (Da and Db). A synchronized data packet with video, audio, data information, or any combination thereof, can be transmitted by the broadcaster through the appropriate sub-channel(s) and can be received by a receiver, such as a digital T.V. or analog T.V. with a proper decoder set-top box tuned to the particular broadcast channel. When the receiver is a digital T.V., circuitry within the digital T.V. processes the data portion of a data packet as well as the audio, and video information (if present) is transmitted in the respective subchannels based upon the corresponding time stamp. For example, processing the data packet 102 having video information (D1) requires the T.V. receiver to process the video data in such a way that the corresponding video image is displayed on a monitor coupled to the T.V. receiver during a time interval based upon the associated time stamp (T1). Thus, a T.V. receiver tuned to a particular channel must also access the associated synchronized data packet D1 and process the data included in the packet D1 all within the time constraints dictated by the time stamp T1.

In a similar manner, data is transmitted in a synchronized data packet on a data subchannel such as Da and Db. In many applications, such as interactive T.V., during what is referred to as synchronized processing, one must be able to process the data included in a data packet according to the time constraint indicated by the time stamp. For example, in applications such as interactive T.V., data can be processed by an interactive application program that is running on the digital T.V. and presented with audio and video in a synchronized manner.

Unfortunately, with conventional models, accessing and processing of synchronized data is problematic. This is partly attributed to the fact that a receiver does not have control over the time and the amount of data that can be transmitted by the broadcaster. To elaborate, FIG. 2 illustrates a conventional T.V. receiver 200. A tuner 204 included in the T.V. receiver 200 is tuned to a desired broadcast channel and receives the broadcast information transmitted on that channel. A demultiplexer 205 is used to divide the broadcast information into subchannels video (V), audio (A), data (D)a, and data (D)b. In this arrangement, synchronized data packets are received by the receiver 200 via a data subchannel, such as subchannel Da.

Typically, data packets are received as a single stream of data. For example, data packets 102–104 are stored in a buffer 208. Typically, the receiver 200 checks the buffer 208 to determine whether data is available for processing. In conventional models, the receiver 200 starts accessing data from the buffer 208 and sequentially accesses data packets 102, 104, and 106 in the order that they are received. To elaborate, the receiver 200 accesses synchronized data D1 of data packet 102 and processes it during a time interval defined by the time stamp T1. However, in some situations, data is transmitted at a higher rate than the receiver 200 can process it, in which case it is possible that the receiver 200 falls behind in processing. For example, while the receiver 200 is processing synchronized data packet 104, it is possible the time stamp T3 for processing and presentation of synchronized data packet 106 expires. Thus, the receiver 200 would be unable to process and present data in a timely manner since the data associated with the data packet 106 is lost.

One problem with conventional data accessing approaches is that buffer 208 has to be constantly checked to determine whether data is available for processing. This is an inefficient approach that wastes processing time. Another problem is that there is no mechanism to notify the receiver of loss of data, for example, as a result of buffer overwrite, due to a high transmission rate. Yet another problem is that when a receiver falls behind in processing synchronized data, there is no mechanism to allow the receiver to resynchronize with the broadcast transmission.

In view of the foregoing, there is a need for improved methods and apparatus for keeping track of and accessing synchronized data transmitted by a broadcaster.

SUMMARY OF THE INVENTION

Broadly speaking, the invention relates to methods and apparatus for accessing data that is transmitted by a broadcaster. In accordance with one aspect of the invention, a receiver capable of accessing selected portions of synchronized data that is transmitted by a broadcaster in a broadcasting system is disclosed. The receiver includes a synchronized data accessing system capable of providing access to synchronized data transmitted by the broadcaster, the synchronized data accessing system providing an interface that can be used by a data requester to access synchronized data, wherein the data requester can initiate a request to access synchronized data using the interface and data can be made available and accessed by the data requester through the interface.

In accordance with another embodiment, a method of accessing synchronized data transmitted by a broadcaster in a broadcast system is disclosed. The method includes acquiring a listener interface, the listener interface providing an interface for a data requester to request access to synchronized data. The method further includes acquiring a point of access interface, the point of access interface allowing the listener to access synchronized data. In addition, the listener interface is linked to the point of access interface, as well as accessing synchronized data through the listener interface via the point of access interface.

The invention can be implemented in numerous ways, including as a computer system, an apparatus, and a method. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to methods, apparatus, and data structures suitable for accessing synchronized data in a broadcast system. In accordance with one aspect of the invention, a receiver capable of receiving synchronized data transmitted by a broadcaster is disclosed.

Figure 1:
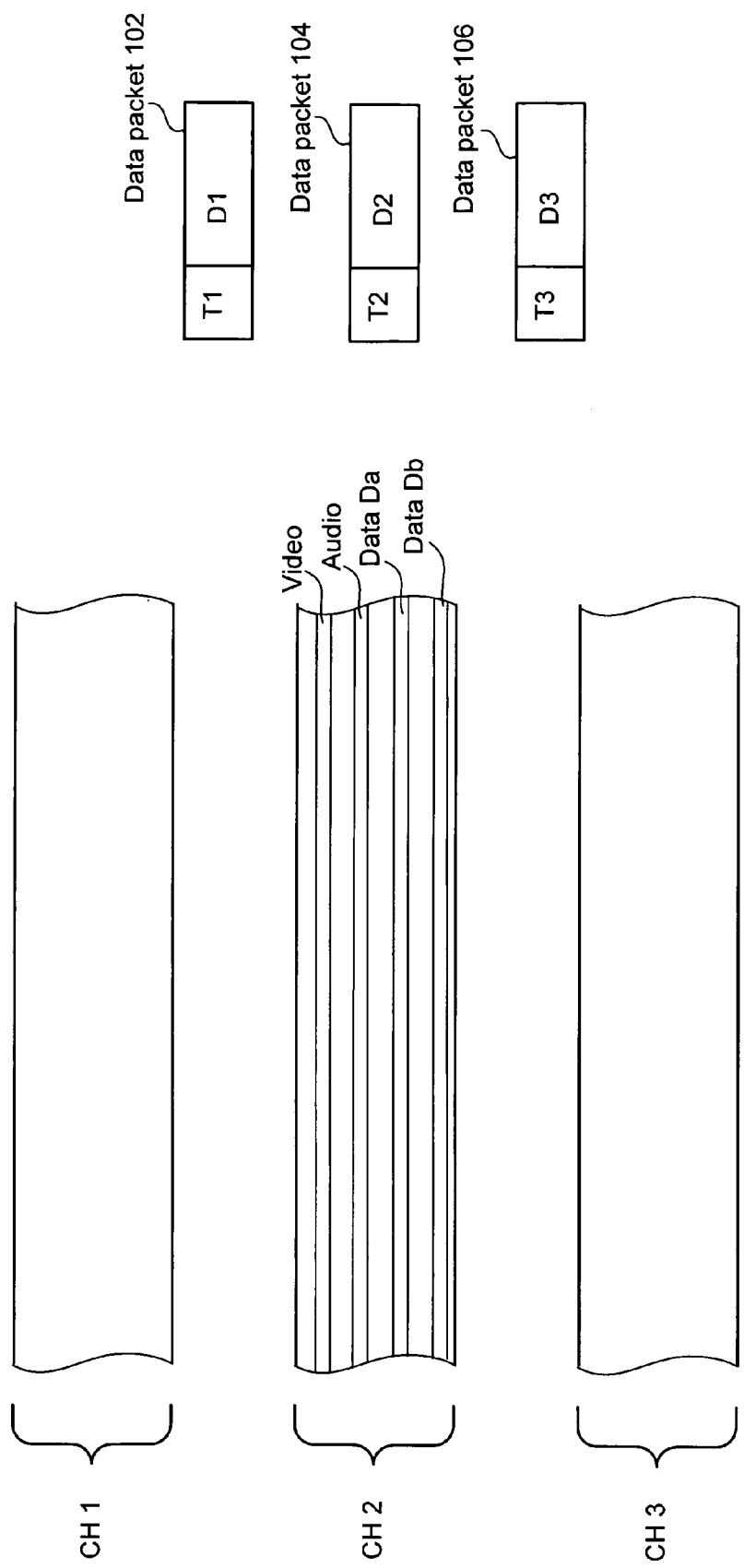
FIG. 1 illustrates conventional synchronized data packets transmitted by a T.V. broadcaster.
Figure 2:
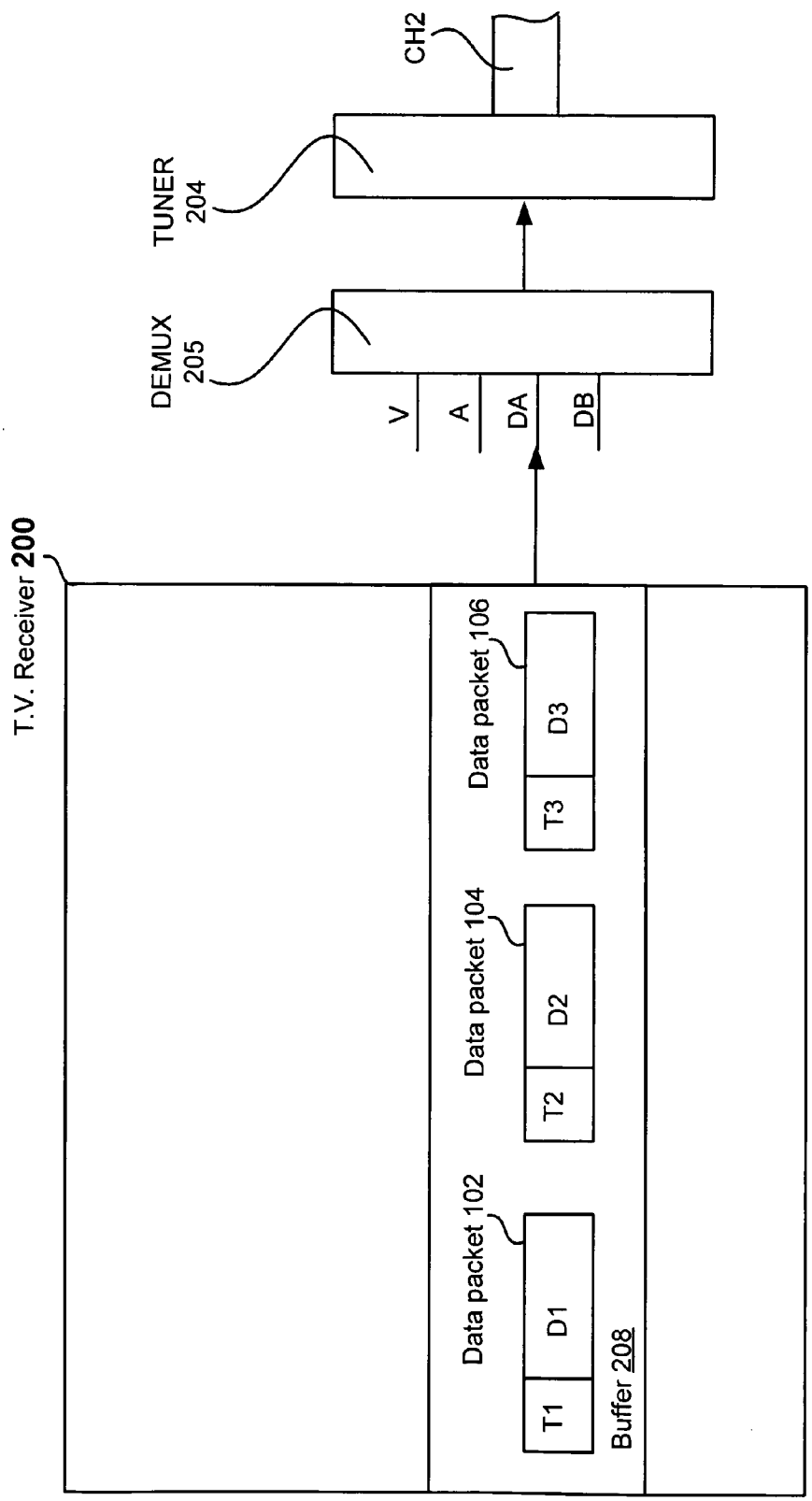
FIG. 2 illustrates a conventional digital T.V. receiver.
Figure 3:
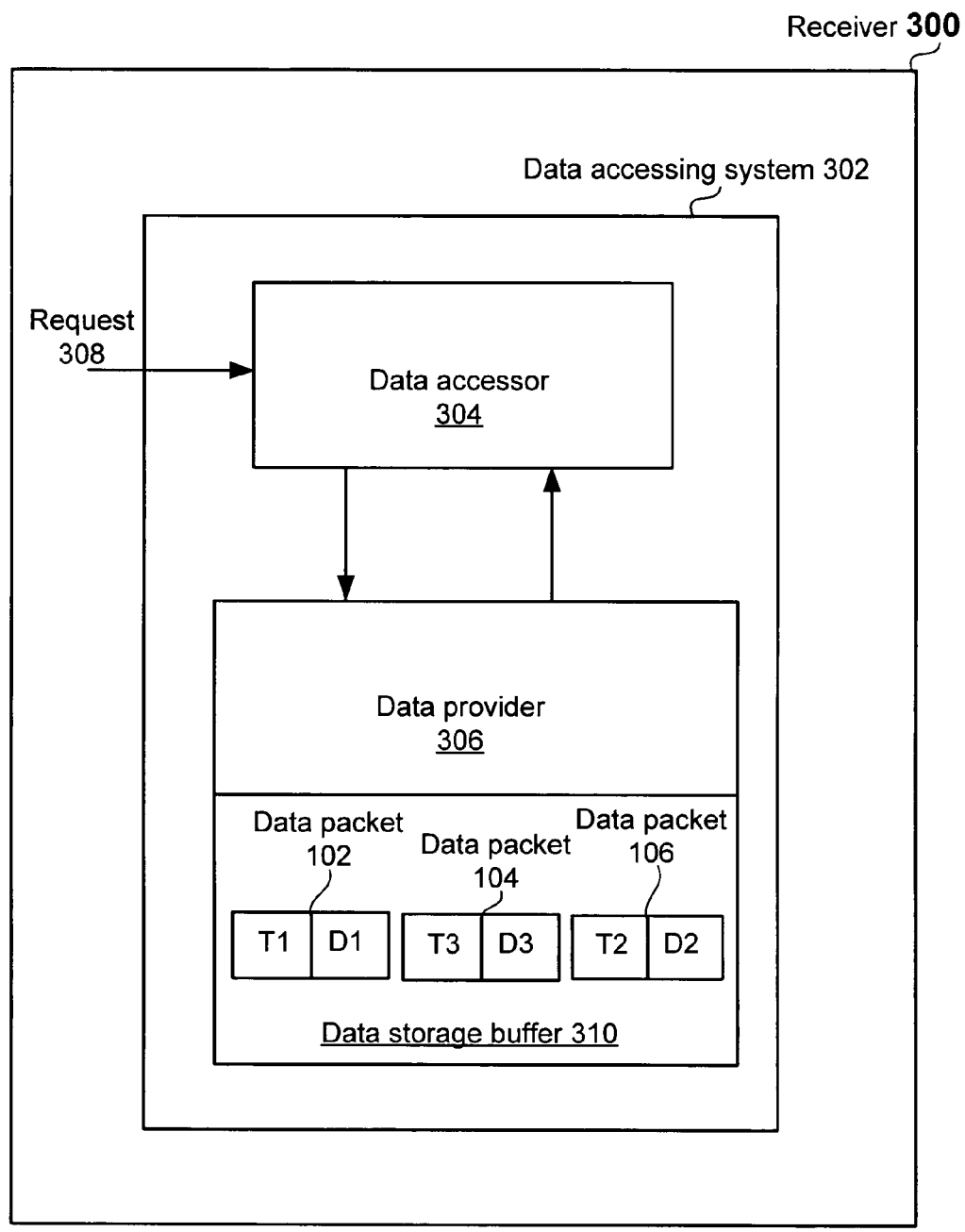
FIG. 3 illustrates a receiver suitable for reception of synchronized data, in accordance with an embodiment of the present invention.

FIG. 3 illustrates a receiver 300 suitable for accessing synchronized data transmitted by a broadcaster in accordance with an embodiment of the present invention. It should be noted that the receiver 300 can be any device suitable for reception of broadcast data, e.g., a digital T.V., set-top box, analog T.V. coupled to a set-top box, as well as a computer (a lap top computer, etc.) For example, the receiver can be a digital T.V. or a set-top box running an interactive program where the receiver is implemented as a virtual machine supporting an open interface, e.g., Java Programming Interface, Java T.V., etc.

The receiver 300 includes a synchronized data accessing system 302 suitable for providing efficient access to synchronized data transmitted by a broadcaster. As illustrated in FIG. 3, the synchronized data accessing system 302 includes a synchronized data accessor 304 and a synchronized data provider 306. The synchronized data accessor 304 can receive a request 308 for accessing synchronized data transmitted on a particular broadcast service, e.g., a channel or subchannel. By way of example, the request 308 can be initiated by an application program that requires access to synchronized data transmitted on a particular channel.

The synchronized data accessor 304 can, in turn, request the synchronized data from the synchronized data provider 306. When synchronized data is transmitted and received, the synchronized data provider 306 can store it in a data storage buffer 310. After synchronized data is received, the synchronized data provider 306 notifies the synchronized data accessor 304 that data is available for access. In this way, synchronized data accessor 304 does not have to check for the arrival of data, thereby freeing the synchronized data accessor 304 to receive and initiate additional requests for access to synchronized data.

In the described embodiment, when a data arrival notification is received, the synchronized data accessor 304 notifies the original data requester (that can be, for example, an application program) that data is available for access. In this manner, a notification can be provided when data is ready for access so that an application program does not waste processing time determining whether data has arrived. Thus, an application program can efficiently access data and devote more time to other tasks.

In accordance with a particular embodiment of the invention using the data arrival notification, synchronized data provider 306 provides information including the time stamp and length of synchronized data that is available to be accessed. By providing information about the synchronized data that has been received, more flexibility in data access can be achieved. In addition, the information about synchronized data can be used to make more efficient data accessing decisions.

Furthermore, in case when data is unavailable, the synchronized data provider 306 can send an error notification to the data accessor 304. This error notification can be sent to a data requester (an application program, for example) so that the error can be handled accordingly. In accordance with one particular embodiment, synchronized data accessor 304 can also send a request to resynchronize data access. For example, the synchronized data provider 306 can be asked to send notification of the last synchronized data packet received. Advantageously, this enables a data requester to resynchronize with the broadcast transmission.

Although the synchronized data provider 306 is depicted to include a data storage buffer 310, it should be noted that data storage buffer 310 can reside outside of the synchronized data provider 306 without departing from the scope and spirit of the invention. It should also be noted that besides a data storage device, other suitable mechanisms to store and pass data to synchronized data accessor 304 may be implemented.

Figure 4:
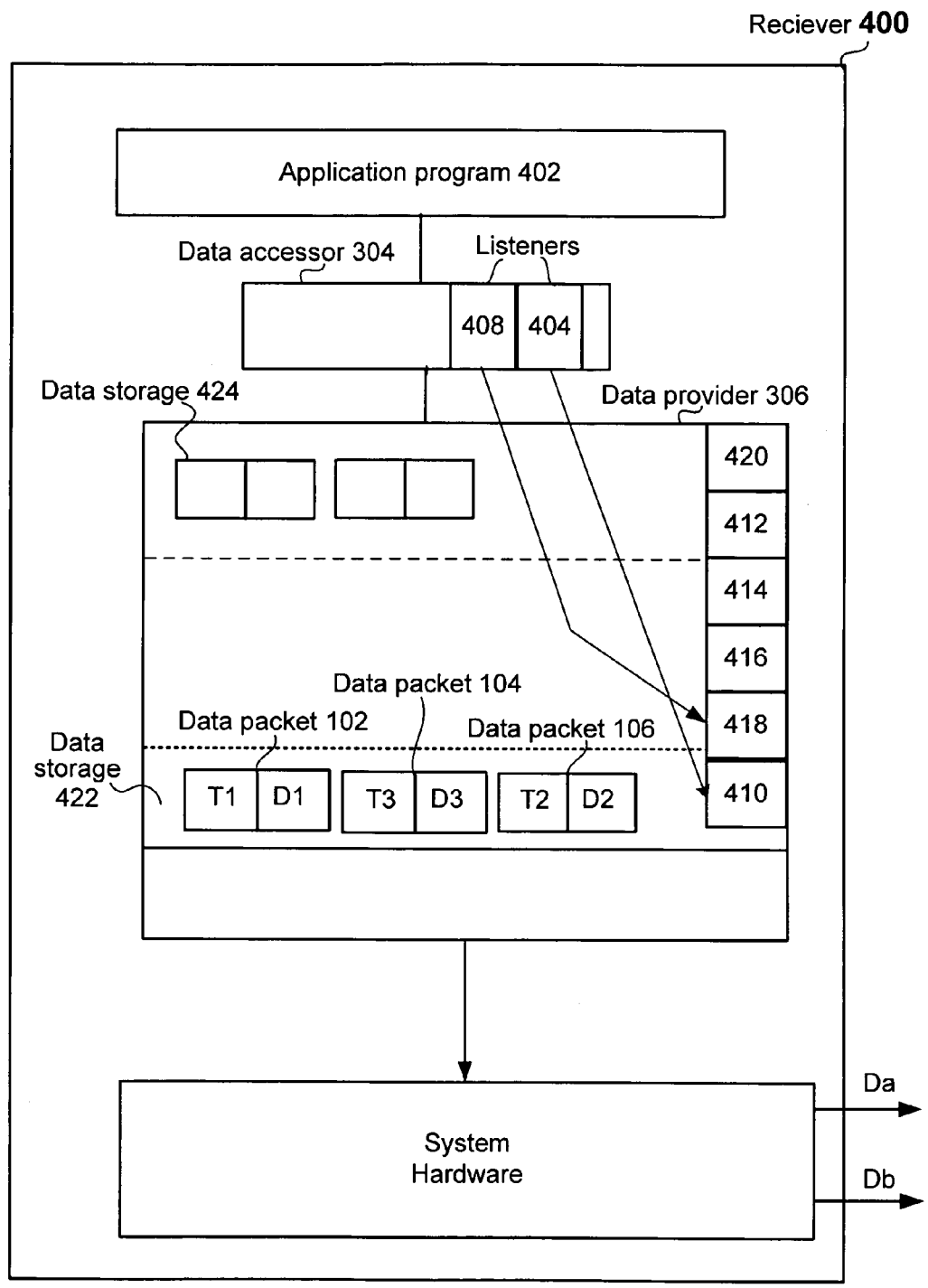
FIG. 4 illustrates a receiver suitable for reception of synchronized data, in accordance with an embodiment of the present invention.

FIG. 4 illustrates a receiver 400 suitable for reception and processing of synchronized data, in accordance with another embodiment of the present invention. The receiver 400 includes the synchronized data accessor 304 and the synchronized data provider 306. As shown, an application program 402 is running on the receiver 400. By way of example, the application program 402 can be an interactive application program or applet. The application program 402 requires access to synchronized data that is transmitted by a broadcaster on a particular channel and received via a data subchannel (Da or Db). Synchronized data can then be provided to the application program 402 for synchronized processing of data for applications, such as interactive T.V. or other such arrangements.

In one embodiment, the synchronized data accessor 304 is implemented as an application programming interface (API). The API provides a listener interface that can be used to efficiently access synchronized data. The application program 402 can use the API to initiate one or more listeners, such as listeners 404 and 408. A listener, such as listener 404, can be used to provide access to synchronized data transmitted on a particular broadcast channel via a data subchannel, e.g., Da.

In addition to listeners, one or more points of access can be initiated and used to provide synchronized data access to the application program through a listener. Points of access 410–420 can be provided by synchronized data provider 306. In this embodiment, synchronized data provider 306 is implemented as a part of system software and is capable of providing a point of access for a listener.

A point of access, such as the point of access 410, can be designated and linked to a listener 404, thereby allowing the listener interface 404 to access synchronized data via the point of access 410. When synchronized data is received, it can be provided to the synchronized data provider 306. In one embodiment, synchronized data provider 306 can store synchronized data packets and make them available for access upon request. For example, synchronized data requested by listener 404 is maintained in data storage 422, and synchronized data requested by listener 408 is maintained in data storage 424, and so forth.

Advantageously, upon arrival of data, synchronized data provider 306 sends a notification to the appropriate listener. For example, when synchronized data packet 102 is received, a notification is sent to listener 404. In accordance with one embodiment of the present invention, the notification can include information such as the time stamp T1 and length of synchronized data D1. The synchronized data accessor 304 can, in turn, notify the application program 402 that synchronized data has been received and is available for access through the data provider.

In addition, other information, such as the time stamp T1 and the length of synchronized data D1, can be provided in the notification sent to the application program 402. This allows the application program 402 to take appropriate action based on the information that is provided by the synchronized data accessor 304. For example, the application program 402 can initiate a data access through the synchronized data accessor 304 by identifying a desired point of access. The application program 402 can choose to ignore a data arrival notification for a listener but initiate a data access request for data notified through another listener.

In accordance with one embodiment, the application program 402 can choose to access a portion of available data by providing an offset and the length of data to be accessed. In this manner, application program 402 has the flexibility to access data in segments and/or choose to ignore a portion of data available in a synchronized data packet.

Furthermore, if application program 402 initiates access for data that is no longer available in the data storage 422, an error notification can be sent to the application program 402 so that appropriate error handling actions can be taken. For example, if synchronized data packet 102 is no longer available for access, perhaps due to a buffer overfill, an error notification can be sent to the application program 402.

In one embodiment, the application program can resynchronize with the broadcast transmission by sending a request to be notified of the last data available for access on a particular listener. For example, if application program 402 falls behind in processing synchronized data, it can send a request to receive notification of the last synchronized data packet received. The synchronized data provider 306 can allow access to the last synchronized data packet 106 received and continue sending notifications when the next synchronized data packet is available for access. In this way, the application program 402 can resynchronize with the broadcast transmission.

Figure 5:
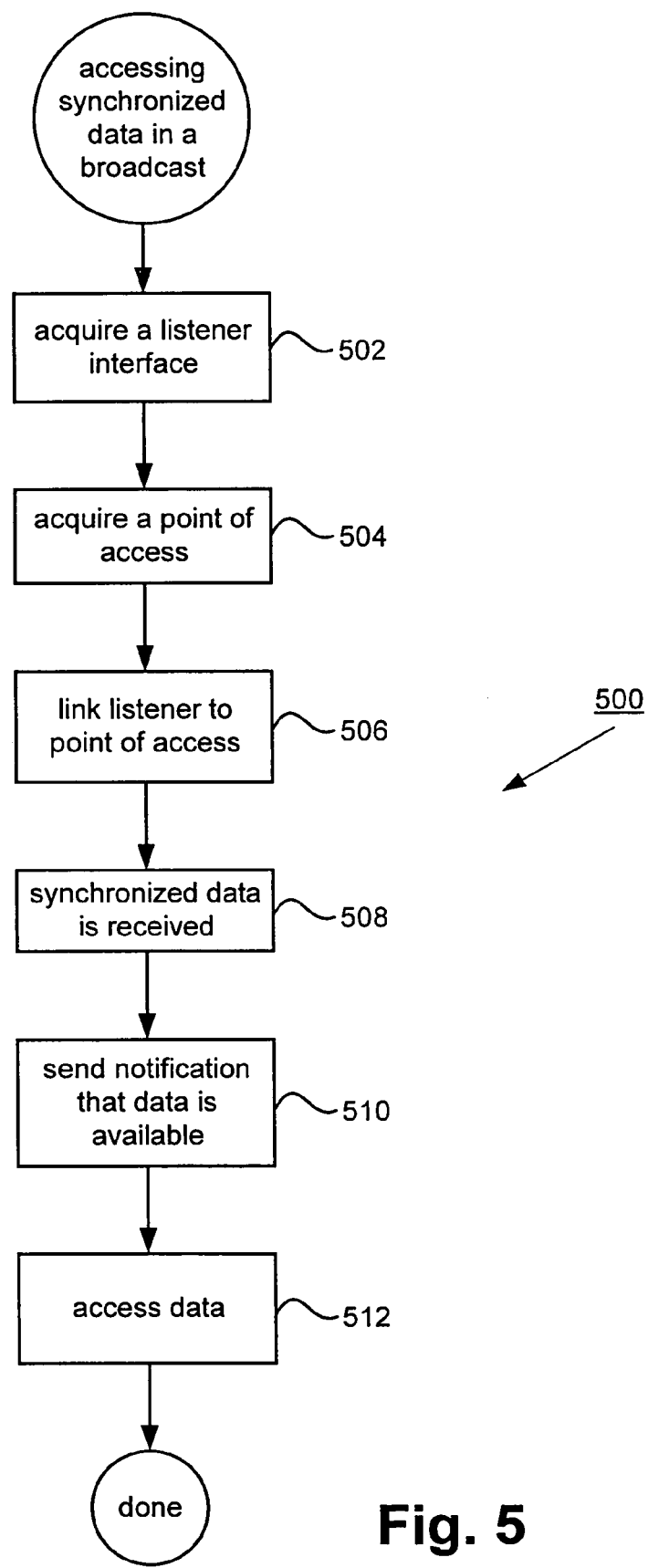
FIG. 5 illustrates a method of accessing synchronized data in a broadcast system, in accordance with a particular embodiment of the present invention.

FIG. 5 shows a flowchart detailing a method 500 of accessing synchronized data transmitted in a broadcast system in accordance with an embodiment of the present invention. In operation, at 502, a listener interface is acquired. In one embodiment, the listener interface is implemented as an interface in an object programming language such as C++, Java, etc. For example, in one particular embodiment, the listener interface is implemented as a Java public abstract interface as an interface for providing notification of pending synchronized data that is available for access.

Next, at operation 504, a point of access is acquired. In one embodiment, this point of access is an access interface defined in an object programming language such as C++, Java, etc. For example, in one particular embodiment, this access interface is a Java public abstract interface that can be provided as an access object to a listener.

The acquired listener interface is linked to the point of access, as noted at 506. In one particular embodiment, this linking operation is implemented as a Java method that registers the listener interface with the point of access interface to provide the listener with notification indicating the availability of data for access from the point of access.

Next, at 508, synchronized data is received and is available for access from the point of access interface. Upon arrival of synchronized data, a notification is sent to the appropriate listener to indicate availability of data, as noted in operation 510. The notification is sent to notify the listener that data can be transferred from the point of access. In one particular embodiment, this notification is implemented as a Java method for reception of a Java event that provides information such as the time stamp and length of a synchronized data packet that is available for access.

Finally, synchronized data is accessed through the point of access at 512. Synchronized data can be provided via the point of access and made available for access through the listener interface. In one embodiment, data access can be achieved as a read operation of an object programming language, for example, a Java read method.

Method 500 can be used by an application program or applet running on an operating system. An application program or applet can interface with a Virtual Machine running a Real-Time Operating System. In one embodiment, the application program or applet uses a Java T.V. Application Programming Interface (API) to access synchronized data transmitted by a broadcaster. The JAVA TV API is an extension of the JAVA platform developed by Sun Microsystems of Mountain View, Calif.

Although only a few embodiments of the present invention have been described, it should be understood that the present invention may be embodied in many other specific forms without departing from the spirit or scope of the invention. By way of example, although method 500 has been set forth in terms of a particular sequential order for the purposes of this explanation, it should be apparent that in many cases the ordering is not critical. Some operations may be combined or eliminated and others may be parsed into multiple operations. For example, operation 512 can be implemented as a series of multiple access operations or may be eliminated since, in some cases, access to synchronized data may not be desired. The same functionality can also be obtained using different operations as well.

The invention has numerous advantages. One advantage is that data arrival notification can be provided to allow efficient access of synchronized data. Another advantage is that error notifications can be sent to allow appropriate error handling actions to be taken. Yet another advantage is that synchronized data can be accessed based on information, such as time stamp and length of synchronized data. Still another advantage is that cost effective and efficient solutions can be implemented to access synchronized data.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A receiver suitable for accessing selected portions of synchronized data transmitted by a broadcaster in a broadcasting system, the receiver comprising:

a synchronized data accessing system capable of providing an application program with access to synchronized data transmitted by the broadcaster in the broadcasting system, the synchronized data accessing system including an application programming interface which can be used by the application program as an interface to the synchronized data accessing system, wherein the application programming interface can also be used by the application program to initiate a listener provided by the application programming interface as a listener interface for accessing a selected portion of synchronized data transmitted by the broadcaster and, wherein the application subsequently waits for a notification that notifies the application program that the selected portion of synchronized data is available and can be accessed by the application program after initiating the listener, wherein the listener determines whether the selected portion of synchronized data is available for access and notifies the application program that the selected portion of synchronized data can be accessed at a point of access which can be linked to the listener when the listener determines that the selected portion of synchronized data is available and can be accessed, thereby allowing the application program to access the selected portion of synchronized data at the point of access when it becomes available without having to monitor the data transmitted by the broadcaster for broadcast of the selected portion of synchronized data.

2. A receiver as recited in claim 1, wherein the listener sends a notification to the application program to notify the application program that the selected portion of synchronized data can be accessed at the point of access.

3. A receiver as recited in claim 2, wherein the notification includes information associated with the selected portion of synchronized data.

4. A receiver as recited in claim 3, wherein the notification includes a timestamp.

5. A receiver as recited in claim 3, wherein the notification includes a length of data indicator that indicates the length of data which is available for access.

6. A receiver as recited in claim 3, wherein the notification includes a timestamp for data which is available for access and a length of data indicator that indicates the length of data which is available for access.

7. A receiver as recited in claim 1, wherein the synchronized data accessing system additionally provides error handling information.

8. A receiver as recited in claim 1, wherein the synchronized data accessing system provides information that can be used by said application program to access the selected portion of synchronized data in segments.

9. A receiver as recited in claim 1, wherein the synchronized data accessing system further includes a data accessor and a data provider.

10. A receiver as recited in claim 9, wherein the data accessor can send a request to resynchronize data.

11. A receiver as recited in claim 10, wherein the data provider sends an error notification to the data accessor.

12. A method of accessing synchronized data transmitted by a broadcaster in a broadcast system, the method comprising:

providing an application program interface which can be used by an application program as an interface for accessing synchronized data transmitted by the broadcaster, wherein the application program interface includes a listener interface which can be used by the application program to generate a listener;

causing the listener interface to generate a listener;

acquiring by the application program the listener;

acquiring by the application program a point of access where synchronized data can be accessed;

determining by the listener that synchronized data is available for access;

linking the listener interface to the point of access interface and accessing by the application program the point of access;

notifying the application program by the listener that synchronized data can be accessed at the point of access; and accessing by the application program the synchronized data at the point of access.

13. A method as recited in claim 12, wherein the method further comprises sending a notification by the listener to the application program to indicate that data is ready for access.

14. A method as recited in claim 13, wherein the notification includes a time stamp and a length of data indictor that indicates the length of data.

15. A method as recited in claim 12, wherein the method further comprises sending an error notification to the application program.

16. A computer readable medium including computer program code for accessing synchronized data transmitted by a broadcaster in a broadcast system, the computer readable medium comprising:

computer program code for providing an application program interface which can be used by an application program as an interface for accessing synchronized data transmitted by the broadcaster, wherein the application program interface includes a listener interface which can be used by the application program to generate a listener;

computer program code for causing the listener interface to generate a listener;

computer program code for acquiring by the application program the listener;

computer program code for acquiring by the application program a point of access where synchronized data can be accessed;

computer program code for determining by the listener that synchronized data is available for access;

computer program code for linking the listener interface to the point of access interface and accessing by the application program the point of access;

computer program code for notifying the application program by the listener that synchronized data can be accessed at the point of access; and computer program code for accessing by the application program the synchronized data at the point of access.

17. A computer readable medium as recited in claim 16, further comprising:

computer program code for sending a notification to a data requester to indicate that data is ready for access.

18. A computer readable medium as recited in claim 17, wherein the notification includes a time stamp and a length of data indictor that indicates the length of data.

19. A receiver suitable for accessing a selected portion of synchronized data which is transmitted by a broadcaster in a broadcasting system, the receiver comprising:

a synchronized data accessing system capable of providing access to synchronized data transmitted by the broadcaster, the synchronized data accessing system providing an application programming interface that can be used by an application program to request access to a selected portion of synchronized data that is transmitted by a broadcaster in a broadcasting system;

wherein the synchronized data accessing system includes:

a listener application programming interface that is capable of listening to determine whether a selected portion of the synchronized data has been transmitted and send a notification when the selected portion of synchronized data becomes available, thereby allowing the application program to initiate a request to access a first selected portion of synchronized data by initiating a first listener and waiting for a first notification that indicates the first selected portion of data is available; and a point of access interface that provides the application program access to synchronized data, wherein a first point of access is capable of being generated and linked to the first listener, thereby allowing the application program to access the first selected portion of synchronized data through the first point of access after the application program receives the first notification.

* * * * *